US011283477B2

(12) United States Patent
Cenanovic et al.

(10) Patent No.: US 11,283,477 B2
(45) Date of Patent: Mar. 22, 2022

(54) RADIO RECEIVING DEVICE FOR A VEHICLE

(71) Applicant: AUDI AG, Ingolstadt (DE)

(72) Inventors: Amir Cenanovic, Hepberg (DE); Lars Reichardt, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 17/289,644

(22) PCT Filed: Oct. 29, 2019

(86) PCT No.: PCT/EP2019/079501
§ 371 (c)(1),
(2) Date: Apr. 28, 2021

(87) PCT Pub. No.: WO2020/099120
PCT Pub. Date: May 22, 2020

(65) Prior Publication Data
US 2021/0399753 A1    Dec. 23, 2021

(30) Foreign Application Priority Data

Nov. 15, 2018  (DE) ..................... 10 2018 219 569.2

(51) Int. Cl.
*H04B 1/38*         (2015.01)
*H04B 1/3822*       (2015.01)
(Continued)

(52) U.S. Cl.
CPC ......... *H04B 1/3822* (2013.01); *H01Q 1/2291* (2013.01); *H01Q 1/32* (2013.01); *H04B 7/0857* (2013.01); *H04H 40/18* (2013.01)

(58) Field of Classification Search
CPC combination set(s) only.
See application file for complete search history.

(56) References Cited

U.S. PATENT DOCUMENTS 8,170,471 B2     5/2012  Cho et al.
10,187,103 B2    1/2019  Spehl
(Continued)

FOREIGN PATENT DOCUMENTS

DE      102015012893 A1    4/2017
DE      102017203993 A1    9/2018
(Continued)

OTHER PUBLICATIONS

International Search Report and Written Opinion of the International Searching Authority directed to related International Patent Application No. PCT/EP2019/079501, dated Jan. 30, 2020, with attached English-language translation; 14 pages.
(Continued)

*Primary Examiner* — Junpeng Chen
(74) *Attorney, Agent, or Firm* — Sterne, Kessler, Goldstein & Fox P.L.L.C.

(57) ABSTRACT

The present disclosure relates to a radio receiving device for a vehicle, having a first signal processing unit, which comprises an MRC module for combining a plurality of synchronized analog intermediate frequency signals into one combined analog intermediate frequency signal and a demodulator for extracting a useful signal from the combined analog intermediate frequency signal. The present disclosure further relates to a radio receiving system and a method for a vehicle-to-vehicle communication, and/or for receiving a radio signal from a stationary radio transmitter.

10 Claims, 2 Drawing Sheets

(51) Int. Cl.
*H04B 7/08* (2006.01)
*H01Q 1/32* (2006.01)
*H01Q 1/22* (2006.01)
*H04H 40/18* (2008.01)

(56) References Cited

U.S. PATENT DOCUMENTS

| | | |
|---|---|---|
| 10,256,532 B2 | 4/2019 | Mohaupt |
| 2004/0192193 A1 | 9/2004 | Silvester |
| 2014/0242904 A1 | 8/2014 | Pandey et al. |
| 2017/0302366 A1 | 10/2017 | Yin et al. |
| 2018/0124822 A1* | 5/2018 | Wang ............. H04W 74/006 |
| 2019/0229952 A1* | 7/2019 | Sun ............. H04L 25/0204 |
| 2020/0091608 A1* | 3/2020 | Alpman ............. H01Q 1/38 |
| 2020/0252255 A1* | 8/2020 | Sorrentino ............. H04B 7/068 |
| 2021/0136699 A1* | 5/2021 | Scholand ............. H04W 52/242 |
| 2021/0337488 A1* | 10/2021 | Baldemair ............. H04W 48/16 |

FOREIGN PATENT DOCUMENTS

| | | |
|---|---|---|
| EP | 1873929 A1 | 1/2008 |
| EP | 3163760 A1 | 5/2017 |
| JP | 2008-252491 A | 10/2008 |
| WO | WO 2016/054801 A1 | 4/2016 |

OTHER PUBLICATIONS

International Preliminary Report on Patentability directed to related International Patent Application No. PCT/EP2019/079501, completed Nov. 11, 202.0, with attached English-language translation; 10 pages.

* cited by examiner

RADIO RECEIVING DEVICE FOR A VEHICLE

TECHNICAL FIELD

The present disclosure relates to a radio receiving device for a vehicle, having a first signal processing unit, which comprises an MRC (maximum ratio combining) module for combining a plurality of synchronized analog intermediate frequency signals into one combined analog intermediate frequency signal and a demodulator for extracting a useful signal from the combined analog intermediate frequency signal. The present disclosure further relates to a radio receiving system for a vehicle, to a vehicle, and a method for receiving a radio signal from a stationary radio transmitter.

BACKGROUND

A radio receiving device of the initially described type, having a radio antenna connected to the radio receiving device, is used to receive a terrestrial radio signal, i.e., a radio signal transmitted by a stationary radio transmitter. DE 10 2015 012 893 A1 and EP 3 163 760 A1 each describe radio receiving devices for receiving such radio signals.

The stationary radio transmitter usually comprises a radio transmitting device and a transmitting antenna which is connected to the radio transmitting device. Radio usually refers to a radio signal continuously transmitted by the stationary radio transmitter and transmitting an audio and/or video stream and which provides a radio or television service that can be used by means of the radio receiving device.

The radio signal comprises a carrier signal with a specific carrier frequency and a useful signal, for example, an audio or video stream, which the radio transmitting device imprints onto the carrier signal by modulation. In the case of an amplitude modulation (AM, e.g., medium wave radio), the useful signal modulates the amplitude of the carrier signal and leaves the carrier frequency of the carrier signal unaffected. However, in the case of a frequency modulation (FM, e.g., VHF radio), the useful signal modulates the frequency of the carrier signal in a frequency range around the carrier frequency and leaves the amplitude of the carrier signal unaffected. For this purpose, the useful signal can either be analog (analog radio or analog television) or digitally coded (digital audio broadcasting, DAB, or digital video broadcasting-terrestrial, DVB-T).

A receivable signal level of the radio signal decreases with increasing distance from the stationary radio transmitter. The decrease in signal strength is essentially an inevitable consequence of energy conservation. However, it can be further amplified by shading, for example, in a narrow valley, in a narrow urban canyon or in a tunnel, or in the case of alternative propagation paths, through a destructive, i.e., negative overlapping or canceling interference. As a result, the radio transmitter has a finite range determined by a transmission power and external conditions. A weak radio signal, i.e., a radio signal with a low signal level, is associated with a low signal-to-noise ratio (SNR).

A radio receiving device arranged in a so-called dead zone, i.e., a shaded region or a region with destructive interference of the radio signal and/or at a distance approximately corresponding to the range of the stationary radio transmitter, cannot provide the useful signal with sufficient quality due to the small SNR prevailing in such a location. This can result in strong noise and/or interruptions in the useful signal, i.e., dropouts, which is undesirable.

Mobile radio receiving devices which move relative to a stationary radio transmitter and repeatedly enter dead spots and ranges of changing stationary radio transmitters while moving are especially impacted by the described quality problems. This includes in particular radio receiving devices which are installed in vehicles and usually referred to as car radios for short. Accordingly, the objective is that of improving a reception quality of a radio receiving device for a vehicle such that it provides a useful signal of a satisfactory quality even in the case of a weak radio signal.

The reception quality of a radio receiving device can be improved by combining a plurality of radio signals from the stationary radio transmitter, which are received and provided by a plurality of radio antennas connected to the radio receiving device and spaced apart from one another. In this case, the plurality of radio antennas forms an antenna cluster which is also called an antenna array. The antenna cluster uses the spatial diversity of the radio signal by increasing the probability that at least one of the plurality of radio antennas will receive a radio signal with an acceptable SNR. When the radio receiving device cleverly combines the plurality of radio signals with one another, the SNR of the combined radio signal is increased overall.

An advantageous combination method is the MRC method (maximum ratio combining). DE 10 2017 203 993 A1 discloses a radio receiving system which can use the MRC method to increase the SNR. In this method, the radio signals, or the corresponding intermediate frequency signals generated therefrom, also known as baseband signals, in which the carrier frequency of the radio signal is replaced by a so-called intermediate frequency for practical reasons, are cumulated in a phase-accurate and weighted manner, wherein a weighting factor proportional to the SNR of the respective radio signal is selected. In this way, the combined radio signal contains more radio signals with a larger SNR than with a lower SNR, which is why the combined radio signal has a larger SNR.

The SNR gains theoretically achievable with the MRC method are, for example, 3 dB for 2 radio antennas, 6 dB for 4 radio antennas, and 10 dB for 10 radio antennas. This corresponds to an effective range increase of the stationary radio transmitter by a factor of 1.58, 2.0, and 3.15, respectively. Correspondingly, the radio signal can theoretically be received with 2 radio antennas within at least one and a half times the range, with 4 radio antennas within double the range and with 10 radio antennas within at least three times the range of the stationary radio transmitter.

However, the above-mentioned theoretical SNR gains or theoretical effective range increases require that each of the radio signals received by the radio antennas are uncorrelated. However, a plurality of radio antennas installed in a vehicle does not allow for large distances between the radio antennas because of the relatively small spatial extension of the vehicle. As a result, each of the radio signals received with the radio antennas are relatively strongly correlated, so that the achievable SNR gain is significantly below the theoretical SNR gain.

One way out of the relatively small spatial extension of each individual mobile device having a radio receiving device is to couple a plurality of mobile devices and thus form a large-scale antenna cluster from radio antennas of the mobile devices. The radio antennas of the mobile devices are generally arranged at a relatively great distance from one another, so that the radio signals received in each case are essentially uncorrelated. With such an antenna cluster, an SNR gain can essentially be achieved on a theoretical level. This generally applies to any receiving arrangement having a radio transmitter and a plurality of devices spaced apart from one another and receiving the radio transmitter, with a radio receiving device corresponding to the radio transmitter.

For example, EP 1 873 929 A1 discloses a receiving arrangement for a mobile radio network which comprises a base station of the mobile radio network and at least two mobile terminals which each comprise a mobile radio antenna and are connected to the base station via mobile radio signals. In the receiving arrangement, data are transmitted between the base station and a first mobile terminal partly directly and partly indirectly via a second mobile terminal. In this way, the at least two mobile radio antennas of the mobile terminals form an antenna cluster which can use a spatial diversity of the mobile radio signal.

In contrast, U.S. Pat. No. 8,170,471 B2 discloses a receiving arrangement with a plurality of vehicles communicating with one another and stationary communication units arranged at the roadside, each having an antenna and being connected to one another via radio signals. In the receiving arrangement, data are transmitted between a first vehicle and a second vehicle indirectly via at least one further vehicle and/or a stationary communication unit. As a result, other vehicles and/or stationary communication units involved in the data transmission act as repeaters and can provide several alternative transmission paths between the first vehicle and the second vehicle. In this way, a spatial diversity of the radio signals is used in order to increase a range of the vehicle-to-vehicle (C2C) communication.

A further receiving arrangement is described in WO 2016/054801 A1. The receiving arrangement comprises a geostationary satellite and a plurality of vehicles, each having a satellite receiving device, a satellite antenna connected to the satellite receiving device, and a WLAN antenna and each receiving a satellite signal transmitted by the satellite as well as being connected to further vehicles in a wireless ad hoc network. The satellite signal includes multimedia data, such as satellite television data, as a useful signal. The satellite signals are transmitted to one of the plurality of vehicles via the ad hoc network. Said vehicle generates one combined satellite signal, and subsequently the useful signal, from the received satellite signals and transmits the generated useful signal to the further vehicles. In this way, using a spatial diversity of the satellite signal, both an overall SNR gain and a quality increase of the useful signal are achieved for each vehicle involved.

However, this receiving arrangement has the problem that the vehicles connected in the ad hoc network no longer receive a useful signal when the vehicle generating and transmitting the useful signal leaves the ad hoc network.

BRIEF DESCRIPTION OF DRAWINGS/FIGURES

DETAILED DESCRIPTION

Figure 1:
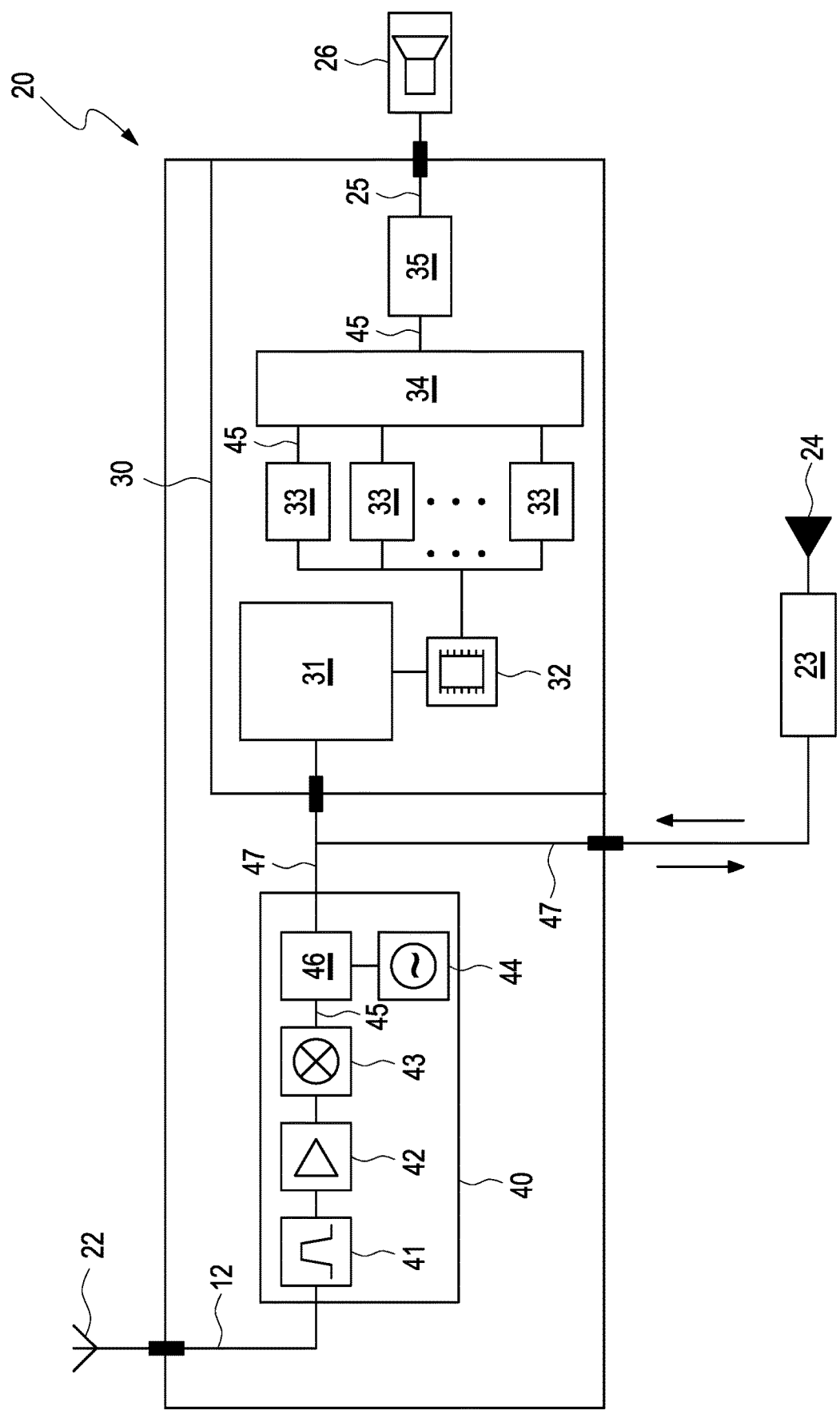
FIG. 1 shows a schematic depiction of a block diagram of a radio receiving system in accordance with some embodiments.

In the present disclosure, an improved radio receiving system for a vehicle, which avoids the above disadvantages is described. In addition, the problem addressed by the present disclosure is that of specifying a vehicle and a method for receiving a radio signal from a stationary radio transmitter.

In some embodiments, a radio receiving system for a vehicle is disclosed. The radio receiving system comprises a first signal processing unit which comprises an MRC (maximum ratio combining) module for combining a plurality of synchronized analog intermediate frequency signals into one combined analog intermediate frequency signal and a demodulator for extracting a useful signal from the combined analog intermediate frequency signal. The intermediate frequency signals each correspond to a radio signal such that, in the case of an identical useful signal, the carrier frequency of the radio signal is replaced for practical reasons by a so-called intermediate frequency different from the carrier frequency. The useful signal can be, for example, an audio stream from a radio service or a video stream from a television service.

The radio receiving device could be used to connect a plurality of radio antennas installed in a vehicle. However, due to the relatively strong correlation of the radio signals received with the plurality of radio antennas, it would only be possible to achieve an SNR gain which is significantly below a theoretically achievable value.

In some embodiments, the first signal processing unit comprises an intermediate storage device for a plurality of synchronizable digitized intermediate frequency signals and a plurality of D/A converters for generating an analog intermediate frequency signal from each digitized intermediate frequency signal stored in the intermediate storage device. The intermediate storage device forms a buffer for the plurality of digitized intermediate frequency signals. In this way, a plurality of digitized intermediate frequency signals can be used to generate the useful signal.

In some embodiments, the signal processing unit preferably comprises a processor operating in the intermediate storage device and executing each D/A converter, i.e., the D/A converters can be provided as instances of a software module, which are executed by the processor and applied to the digitized intermediate frequency signals. Of course, the number of instances of the software module can always be adapted to the number of digitized intermediate frequency signals currently to be processed by generating or destroying instances correspondingly.

In this case, the digitized intermediate frequency signals can be provided by different sources. By way of a non-limiting example, the different sources do not necessarily have to be arranged in the vehicle in which the radio receiving device is installed. In other words, the digitized intermediate frequency signals create source independence for the radio receiving device.

In some embodiments, the radio receiving device comprises a second signal processing unit which is connected upstream of the first signal processing unit and is configured to generate a digitized intermediate frequency signal from a radio signal of a stationary radio transmitter. The second signal processing unit can comprise a filter, an amplifier for example, low noise amplifier, LNA, connected to the filter, a mixer connected to the amplifier, and an intermediate frequency oscillator connected to the mixer in order to generate an analog intermediate frequency signal from the received radio signal, which corresponds to the radio signal. The second signal processing unit further comprises an A/D converter which is designed to convert the analog intermediate frequency signal into a digitized intermediate frequency signal which can be fed to the first signal processing unit.

In some embodiments, the radio receiving system further comprises a radio antenna for receiving a radio signal from a stationary radio transmitter, a C2C (car-to-car) module for communicating with further vehicles, and a WLAN antenna that can be or is connected to the C2C module. The radio receiving system is thus designed to receive a radio signal and to communicate wirelessly with further vehicles. In addition to a radio signal received by the radio antenna, radio signals received from further vehicles are therefore also accessible to the radio receiving system via the WLAN antenna. The WLAN-p standard (IEEE 802.11p) provided for C2C connections explicitly provides for the exchange of infotainment user data between vehicles.

In some embodiments, the radio antenna and the C2C module can be or are connected to the radio receiving device. The first signal processing unit of the radio receiving device is configured to generate an optimized useful signal from a digitized intermediate frequency signal generated by the second signal processing unit and a plurality of digitized intermediate frequency signals received from further vehicles via the WLAN antenna.

In some embodiments, a vehicle having a radio receiving device or having a radio receiving system is disclosed. The vehicle thus equipped offers largely interference-free use of a radio signal from a stationary radio transmitter through the use of a plurality of digitized intermediate frequency signals for generating the useful signal. By way of a non-limiting example, a radio or television program is largely or completely freed from noise or dropouts, as a result of which the satisfaction of an occupant of the vehicle is increased when using the radio or television program.

In some embodiments, the vehicle is configured to transmit the digitized intermediate frequency signal generated from a radio signal from a stationary radio transmitter to at least one further vehicle via the WLAN antenna and/or to receive a digitized intermediate frequency signal from at least one further vehicle via the WLAN antenna. This capability allows for digitized intermediate frequency signals to be exchanged within a plurality of vehicles, as a result of which the radio antennas of the vehicles form a large-scale antenna cluster which allows a reception of almost uncorrelated radio signals. Correspondingly, an SNR gain of essentially theoretical magnitude can be achieved with the vehicle in interaction with further vehicles.

In some embodiments, a method for receiving a radio signal from a stationary radio transmitter is disclosed. The method includes receiving at a radio receiving device of a vehicle, a radio signal from the stationary radio transmitter via a radio antenna. A first signal processing unit of the radio receiving device generates an analog intermediate frequency signal from the radio signal, an MRC module of the radio receiving device generates one combined analog intermediate frequency signal from a plurality of synchronized analog intermediate frequency signals, and a demodulator of the radio receiving device extracts an audio/video signal from the combined analog intermediate frequency signal. This method can be carried out in vehicles with a plurality of radio antennas, wherein, however, an SNR gain is well below a theoretical value due to the strong correlation of each of the radio signals received.

In some embodiments, the first signal processing unit generates a first digitized intermediate frequency signal from the analog intermediate frequency signal, the radio receiving device receives via a WLAN antenna and a C2C module at least one further digitized intermediate frequency signal from a further vehicle, which can be synchronized with the first digitized intermediate frequency signal, the radio receiving device synchronizes the at least two digitized intermediate frequency signals and a D/A converter of the radio receiving device generates the plurality of analog intermediate frequency signals from the at least two digitized intermediate frequency signals. Each of a plurality of digitized intermediate frequency signals is converted into one analog intermediate frequency signal by means of the D/A converter. In this way, the intermediate frequency signals can be combined by means of a conventional MRC module.

In some embodiments, the at least two digitized intermediate frequency signals are stored in an intermediate storage device of the radio receiving device. In other words, a plurality of digitized intermediate frequency signals is buffered in the intermediate storage device, which allows for the digitized intermediate frequency signals to be synchronized.

In some embodiments, a time stamp is assigned to each digitized intermediate frequency signal and the at least two digitized intermediate frequency signals are synchronized before being combined using the respectively assigned time stamps. Due to the synchronization of the intermediate frequency signals, relative time and/or phase shifts in the digitized intermediate frequency signals are avoided, which further increases the quality of the extracted useful signal.

In some embodiments, the method is carried out by a plurality of vehicles arranged adjacent to one another and/or forming a convoy within a WLAN range. The more vehicles interact in order to carry out the method, the greater the SNR gain achieved and, correspondingly, the quality of the useful signal.

Accordingly, the radio receiving device can achieve a theoretical SNR gain and thus ensures a high quality of the useful signal. The method that can be carried out with the radio receiving device is also organized in a decentralized manner, i.e., the high-quality useful signal is generated in the same way in each of a plurality of vehicles connected to one another by means of WLAN from all the available digitized intermediate frequency signals, so that a change in the cluster as a result of a joining or departing vehicle is unproblematic.

In the drawings, the embodiments of the present disclosure are depicted schematically.

FIG. 1 shows a schematic depiction of a block diagram of a radio receiving system 20 for a vehicle 13, 14 (see FIG. 2) in accordance with some embodiments. The radio receiving system 20 comprises a radio antenna 22 for receiving a radio signal 12 from a stationary radio transmitter 11 (see FIG. 2), a C2C module 23 for communicating with further vehicles 13, 14, and a WLAN antenna 24 connected to the C2C module 23.

The radio receiving system 20 further comprises a radio receiving device 21 for a vehicle 13, 14, which is connected to the radio antenna 22 and the C2C module 23 as well as an audio/video unit 26 for outputting a radio/television program. The radio receiving device 21 is configured to transmit and/or receive a digitized intermediate frequency signal 47 generated from a radio signal 12 received from the stationary radio transmitter 11 via the C2C module 23 and the WLAN antenna 24.

The radio receiving device 21 comprises a first signal processing unit 30. The first signal processing unit 30 comprises an MRC (maximum ratio combining) module 34 for combining a plurality of synchronized analog intermediate frequency signals 45 into one combined analog intermediate frequency signal 45 and a demodulator 35 for extracting a useful signal 25 from the combined analog intermediate frequency signal 45. The useful signal 25 can have, for example, an audio stream of a radio program or a video stream of a television program.

The first signal processing unit further comprises an intermediate storage device 31 for a plurality of synchronizable digitized intermediate frequency signals 47 and a plurality of D/A converters 33 for generating an analog intermediate frequency signal 45 from each digitized intermediate frequency signal 47 stored in the intermediate storage device 31 as well as a processor 32 which operates in the intermediate storage device 31 and executes the plurality of D/A converters 33 designed as instances of a software module. Alternatively, the plurality of D/A converters 33 can also be designed as a specified number of hardware modules.

The radio receiving device 21 also comprises a second signal processing unit 40 which is connected upstream of the first signal processing unit 30. The second signal processing unit 40 comprises a filter 41, an amplifier (low noise amplifier, LNA) 42 connected to the filter 41, a mixer 43 connected to the amplifier 42, and an intermediate frequency oscillator 44 connected to the mixer 43, and is configured to first generate an analog intermediate frequency signal 45 from a radio signal 12 of a stationary radio transmitter 11 and subsequently generate a digitized intermediate frequency signal 47.

Figure 2:
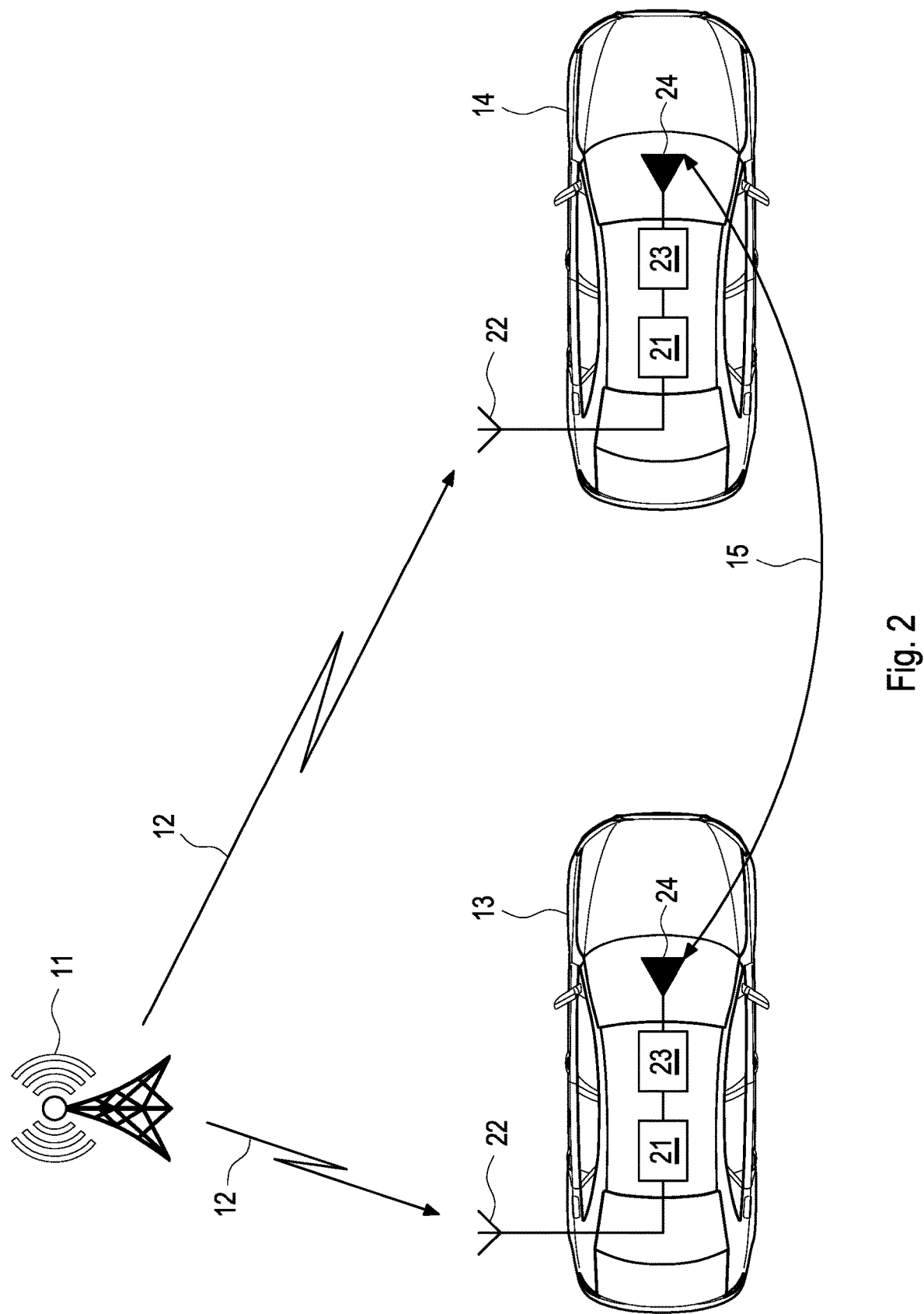
FIG. 2 shows a schematic depiction of a radio receiving arrangement having a stationary radio transmitter and two vehicles, each having the radio receiving system shown in FIG. 1 in accordance with some embodiments.

FIG. 2 shows a schematic depiction of a radio receiving arrangement 10 having a stationary radio transmitter 11 transmitting a radio signal 12 and two vehicles 13, 14 in each of which the radio receiving system 20 shown in FIG. 1 is installed. The two vehicles 13, 14 are arranged adjacent to one another within a WLAN range and form a convoy.

Each vehicle 13, 14 is configured to transmit the digitized intermediate frequency signal 47 generated by the second signal processing unit 40 from the radio signal 12 of the stationary radio transmitter 11 to the respective other vehicle 14, 13 as a WLAN signal 15 via the C2C module 23 and the WLAN antenna 24 and to receive a digitized intermediate frequency signal 47 from the respective other vehicle 14, 13 as a WLAN signal 15 via the WLAN antenna 24 and the C2C module 23.

During operation of the radio receiving arrangement 10, the radio receiving devices 21 of the two vehicles 13, 14 each receive the radio signal 12 from the stationary radio transmitter 11 via the radio antenna 22. In this case, the first signal processing unit 30 first generates an analog intermediate frequency signal 45 from the radio signal 12 and subsequently generates a first digitized intermediate frequency signal 47 from the analog intermediate frequency signal 45. In addition, each radio receiving device 21 receives a second digitized intermediate frequency signal 47, which can be synchronized with the first digitized intermediate frequency signal 47, as a WLAN signal 15 from the respective other vehicle 14, 13 via the WLAN antenna 24 and the C2C module 23.

For the duration of the processing, the two digitized intermediate frequency signals 47 are stored in an intermediate storage device 31 of the radio receiving device 21 serving as a buffer. For this purpose, a time stamp is assigned to each digitized intermediate frequency signal 47, and the two digitized intermediate frequency signals 47 are synchronized using the respectively assigned time stamps. Two D/A converters 33 each generate one analog intermediate frequency signal 45 from the two digitized intermediate frequency signals 47. The MRC module 34 of the respective radio receiving device 21 subsequently generates one combined analog intermediate frequency signal 45 from the two synchronized analog intermediate frequency signals 45. The demodulator 35 of the respective radio receiving device 21 extracts the useful signal 25 from the combined analog intermediate frequency signal 45, which is finally output in a familiar manner by the audio/video unit 26, for example, as a radio program or as a television program, for an occupant of the vehicle 13, 14 in an acoustically and/or visually perceptible manner.

The depicted radio receiving arrangement 10 is described by way of example with only two vehicles 13, 14 and can advantageously comprise further vehicles in order to achieve a greater SNR gain.

LIST OF REFERENCE SIGNS

10 Radio receiving arrangement
11 Stationary radio transmitter
12 Radio signal
13 Vehicle
14 Vehicle
15 WLAN signal
20 Radio receiving system
21 Radio receiving device
22 Radio antenna
23 C2C module
24 WLAN antenna
25 Useful signal
26 Audio/video unit
30 First signal processing unit
31 Intermediate storage device
32 Processor
33 D/A converter
34 MRC module
35 Demodulator
40 Second signal processing unit
41 Filter
42 Amplifier
43 Mixer
44 Intermediate frequency oscillator
45 Analog intermediate frequency signal
46 A/D converter
47 Digitized intermediate frequency signal

The invention claimed is:

1. A radio receiving system for a vehicle, wherein the radio receiving system comprises:
 a radio antenna configured for receiving a radio signal from a stationary radio transmitter;
 a car-to-car (C2C) module configured for communicating with one or more vehicles;
 a wireless local area network (WLAN) antenna configured to be coupled with the C2C module; and
 a radio receiving device configured to be coupled with the radio antenna and the C2C module, wherein the radio receiving device comprises:
  a first signal processing unit comprising:
   a maximum ratio combining (MRC) module configured for combining a plurality of synchronized analog intermediate frequency signals into a combined analog intermediate frequency signal;
   a demodulator configured for extracting a useful signal from the combined analog intermediate frequency signal;
   an intermediate storage device configured for storing a plurality of synchronizable digitized intermediate frequency signals; and
   a plurality of digital-to-analog (D/A) converters configured for generating an analog intermediate frequency signal from each digitized intermediate frequency signal of the plurality of synchronizable digitized intermediate frequency signals stored in the intermediate storage device, wherein the radio receiving system is configured to:
transmit or receive a digitized intermediate frequency signal of the plurality of synchronizable digitized intermediate frequency signals, wherein the digitized intermediate frequency signal is generated from the received radio signal from the stationary radio transmitter via the C2C Module and the WLAN antenna.

2. The radio receiving system of claim 1, wherein the radio receiving device further comprises a second signal processing unit configured to be connected upstream of the first signal processing unit, and generate the digitized intermediate frequency signal.

3. A motor vehicle, comprising:
a radio receiving system comprising:
  a radio antenna configured for receiving a radio signal from a stationary radio transmitter;
  a car-to-car (C2C) module configured for communicating with one or more vehicles;
  a wireless local area network (WLAN) antenna configured to be coupled with the C2C module; and
  a radio receiving device configured to be coupled with the radio antenna and the C2C module, wherein the radio receiving device comprises:
    a first signal processing unit comprising:
      a maximum ratio combining (MRC) module configured for combining a plurality of synchronized analog intermediate frequency signals into a combined analog intermediate frequency signal;
      a demodulator configured for extracting a useful signal from the combined analog intermediate frequency signal;
      an intermediate storage device configured for storing a plurality of synchronizable digitized intermediate frequency signals; and
      a plurality of digital-to-analog (D/A) converters configured for generating an analog intermediate frequency signal from each digitized intermediate frequency signal of the plurality of synchronizable digitized intermediate frequency signals stored in the intermediate storage device,
  wherein the radio receiving system is configured to:
    transmit or receive a digitized intermediate frequency signal of the plurality of synchronizable digitized intermediate frequency signals, wherein the digitized intermediate frequency signal is generated from the received radio signal from the stationary radio transmitter via the C2C module and the WLAN antenna.

4. The motor vehicle of claim 3, wherein the radio receiving device further comprises a second signal processing unit configured to be connected upstream of the first signal processing unit, and generate the digitized intermediate frequency signal.

5. A method, comprising:
receiving, at a radio receiving device of a vehicle, a radio signal from a radio transmitter via a radio antenna of the vehicle;
generating, at a first signal processing unit of the radio receiving device, an analog intermediate frequency signal from the received first radio signal;
generating, at a maximum ratio combining (MRC) module of the radio receiving device, a combined analog intermediate frequency signal from a first set of a plurality of analog intermediate frequency signals, wherein the plurality of analog intermediate frequency signals are generated and synchronized by the first signal processing unit;
extracting, by a demodulator of the radio receiving device, an audio or a video signal from the combined analog intermediate frequency signal;
generating, by the first signal processing unit, a first digitized intermediate frequency signal from the combined analog intermediate frequency signal;
receiving, at the radio receiving device via a wireless local area network (WLAN) antenna and car-to-car (C2C) module of the vehicle, a second digitized intermediate frequency signal from another vehicle;
synchronizing, by the radio receiving device, the first and the second digitized intermediate frequency signals; and
generating, by a digital-to-analog (D/A) converter of the radio receiving device, a second set of the plurality of analog intermediate frequency signals corresponding to the first and the second digitized intermediate frequency signals.

6. The method of claim 5, further comprising storing the first and the second digitized intermediate frequency signals in an intermediate storage device of the radio receiving device.

7. The method of claim 5, further comprising:
assigning a first timestamp to the first digitized intermediate frequency signal and a second timestamp to the second digitized intermediate frequency signal for synchronization of the first and the second digitized intermediate frequency signals; and
synchronizing the first and the second digitized intermediate frequency signals before being combined using the assigned first and second timestamps.

8. The method of claim 5, wherein the radio transmitter is a stationary radio transmitter.

9. The method of claim 5, wherein the vehicle and the other vehicle are adjacent to each other within a range of a wireless local area network.

10. The method of claim 5, wherein the vehicle and the other vehicle are forming a convoy within a range of a WLAN.

* * * * *